Jan. 26, 1965 — R. W. PFEIFFER ETAL — 3,167,421
POWDERED SOLIDS INJECTION PROCESS
Filed June 15, 1962 — 5 Sheets-Sheet 2

FIG. 2

INVENTORS
ROBERT W. PFEIFFER
ROBERT A. BLINCKMANN
BY
ATTORNEYS
AGENT

FIG. 5

INVENTORS
ROBERT W. PFEIFFER
ROBERT A. BLINCKMANN 3,167,421
POWDERED SOLIDS INJECTION PROCESS
Robert W. Pfeiffer, Bronxville, and Robert A. Blinckmann, South Ozone Park, N.Y., assignors to Pullman Incorporated, a corporation of Delaware
Filed June 15, 1962, Ser. No. 202,720
20 Claims. (Cl. 75—42)

This invention relates to the method and means for improving the operation of a blast furnace and is directed to the method of feeding finely divided solids including sponge iron, ore concentrate, fluxing material and carbonaceous material to the hearth of a blast furnace. In a particular aspect, the invention is directed to the method and means of preparing and supplying dry powdered carbonaceous material to a blast furnace at the tuyere level.

Those skilled in the art with the methods of smelting metallurgical ores understand that refractory shaft type blast furnaces are continuously burdened by introducing into the top of the furnace suitable amounts of iron bearing material; fluxing stone, usually limestone or dolomite and carbonaceous solids, usually coke. The upper portion of the furnace above the mantle is known as the shaft to which the raw materials are fed and wherein these raw materials are prepared for smelting by the elimination of volatile matter in the raw material, heating of the non-volatile material to elevated temperatures, including fusion temperatures and the reduction of iron oxide by means of formed CO gases passing upwardly therethrough. The portion of the furnace immediately below the mantle comprises the bosh with the hearth therebelow, wherein smelting of the prepared materials passing down the shaft into iron and slag and separation of the slag-forming constituents from iron-forming constituents is accomplished. The coke introduced to the top of the shaft supplies fuel for heating the mass and is converted to a reducing agent to reduce metal oxides to metal. To heat the ore and flux mixture to a temperature to bring about calcination of the ore and recovery of the metal requires a temperature greater than about 1000° F., brought about by burning coke with a hot blast of air introduced through tuyeres positioned in the upper portion of the hearth. Accordingly, through the exothermic reaction of carbon combining with oxygen to produce carbon dioxide which substantially immediately reacts with incandescent coke to form the reducing agent carbon monoxide, there results from these thermal reactions a net production of about 3970 B.t.u. per pound of carbon consumed.

It is an object of this invention to provide an improved method and means for preparing powdered carbonaceous solid material for injection at the tuyere level of a blast furnace.

Another object of this invention is directed to the method and means for introducing powdered solids at the tuyere level of a blast furnace.

Still another object of this invention is directed to the method and means for independently controlling the flow of powdered solid material fed to each tuyere of a blast furnace.

Other objects and advantages of the method and means of this invention will become more apparent from the following description.

In general, the present invention is directed to providing one or more distributor zones or hoppers for powdered solid carbonaceous material adjacent a blast furnace and providing suitable control means to automatically insure that a constant supply of finely divided carbonaceous solids is available thereto and at the blast furnace irrespective of the solids injection feed rate to the furnace at the pressure conditions encountered; providing at least one large pressurized surge drum for finely divided or powdered carbonaceous material downstream of a grinding and drying section of the process which will isolate this section from upsets at the blast furnace and which will supply, upon demand, carbonaceous solids to the distributor hoppers described above; and providing a control system which will automatically supply and distribute the carbonaceous solids to a plurality of inlets in the hearth so that the solids feed rate through each inlet may be varied at will and independently of the other inlets, or the flow rate may be maintained the same through each inlet without substantial variation therebetween, or the flow rate may be varied at will through one or more tuyeres while still maintaining total coal flow constant.

The relationship of fuel injected to the hearth of a blast furnace to the coke charge savings is generally based on maintaining a maximum adiabatic flame temperature that has been found through experience to be operationally desirable. To utilize increased air blast temperatures above about 1300° F. or 1400° F., it is known to introduce steam or a combustible fuel such as oil or natural gas into the hearth of a blast furnace to obtain adiabatic temperatures therein in the range of from about 3000° F. to about 4000° F., generally from about 3300° F. to about 3500° F. For a given increase in blast temperatures, the amount of any particular fuel that may be injected depends to some extent upon its preheat; but mostly upon the endothermic heat of reaction required to convert the fuel to hydrogen and carbon monoxide. However, for an identical reduction in coke charge rate it has been found that direct injection of a preheated fuel such as preheated carbonaceous fines would enable one to use either a lower blast temperature or a considerably smaller total quantity of carbonaceous fines. Accordingly, the present invention embodies the method and means for directly injecting either relatively cool or preheated finely divided powdered carbonaceous solid material directly to the hearth of a blast furnace.

The method and means of this invention relates to preparing and handling carbonaceous solid material such as soft coal, hard coal or coke by crushing the carbonaceous material to obtain a particle size less than 1/8 inch, for example less than 16 mesh and drying the crushed carbonaceous material to obtain carbonaceous solids having a moisture content below about 3 percent by weight and preferably not substantially above about 1 percent by weight. The dried and crushed carbonaceous material of a fluidizable particle size in the range of from about 0.7 to about 1000 microns, and preferably at least about 72 percent being less than about 75 microns, is conveyed with a suitable drying gas to one or more relatively large primary cyclone separators for the separation and recovery of the powdered carbonaceous solids from the gasiform carrying or suspension forming medium. The gasiform material removed from the primary cyclone separator and containing entrained carbonaceous fines or dust particles may be further separated in suitable gas-solids separation equipment to recover additional dust from the gasiform material. The separated dust may thereby be recovered and eventually combined with the powdered solids separated in and removed from the primary cyclone. The solid carbonaceous material separated in the primary cyclone is passed to a collector hopper from which it is passed through an arrangement of pressure developing hoppers and communicating transfer conduits designed to transfer the solids from a relatively low pressure zone of about atmospheric pressure to a zone of elevated pressure. Arranging the sequence of pressure developing zones one about the other for gravity flow of the solids is one convenient arrangement as shown in the drawings, however, other arrangements may also be employed as desired.

The pressurized surge hopper is sized to provide a suitable storage capacity of solids in the range of from about 10 minutes to about 1 hour. The pressurized finely divided solid carbonaceous material may be aerated sufficiently to keep the solids in a flowable condition or maintained in a relatively dense fluidized condition in the hoppers herein described by the passage of a dry fluidizing gasiform material upwardly therethrough. It is contemplated in the method of this invention of maintaining the pressurized surge vessel, more fully described hereinafter, at substantially atmospheric temperature conditions or at susbtantially higher temperature conditions. That is, when it is desired to pass relatively cool powdered carbonaceous material to the hearth of the blast furnace, the temperature of the pressurized surge vessel will be maintained at substantially atmospheric temperature conditions or other relatively low temperature conditions desired. However, the present invention also contemplates feeding preheated carbonaceous solids to the hearth of the blast furnace. Accordingly, preheating of the solids to a desired elevated temperature in the range of from about 1100° F. to about 1600° F., may be accomplished partially or completely in the pressurized surge drum. This may be accomplished by burning a combustible fuel separately introduced thereto or by burning a portion of the powdered carbonaceous solid material therein with an oxygen-containing gas while maintaining the solids in a relatively dense fluid bed condition as practiced in, for example, a fluid coking operation.

The pressurized surge vessel discussed above is provided with means for withdrawing solids therefrom, preferably a plurality of solids withdrawal conduits or standpipes which may or may not be aerated, extending downwardly therefrom of sufficient length to be provided with control valves suitable for regulating the flow of solids. When employing relatively short withdrawal conduits, blowback or aeration of the valves alone is generally all that is required. The valves regulate the flow of solids passing through and discharged from the bottom thereof into a transfer conduit communicating with a distributor hopper positioned adjacent the blast furnace. The distributor hopper may be positioned adjacent the upper portion or the lower portion of the furnace. Accordingly, the powdered carbonaceous solids discharged from the pressurized surge vessel at an elevated pressure are combined with a suitable dry gasiform material to form a suspension which is thereafter passed through a transfer conduit discharging into a distributor hopper maintained at a desired pressure in the range of from about 5 p.s.i.g. to about 100 p.s.i.g., and preferably above the pressure encountered in the hearth of the blast furnace. When employing more than one distributor hopper, for example, four distributor hoppers, an equal number of transfer conduits communicate between the pressurized surge vessel for conveying a separate stream of the pressurized powdered carbonaceous material to each of the distributor hoppers. It is also contemplated, however, within the scope of this invention, to employ more than one pressurized surge vessel for supplying four or more distributor hoppers. The hoppers employed in the method of this invention are aerated sufficiently to maintain the carbonaceous material therein in a fluid or flowable condition and each distributor hopper is provided with one or more cyclone separators in the upper portion thereof to separate and recover powdered solids from the gasiform material introduced to the hoppers.

In the method of this invention each distributor hopper is maintained at a pressure sufficient to transfer carbonaceous solids therein at a desired rate to one or more solids inlets in the hearth of the blast furnace irrespective of the pressure conditions existing therein. Furthermore, each distributor hopper is provided with one or more, preferably a plurality of withdrawal conduits which may be short or long, such as a standpipe which may or may not be aerated extending downwardly therefrom.

Accordingly, each withdrawal conduit is a separate source of supply of powdered carbonaceous solid material for a single inlet to the blast furnace. That is, each solids inlet or injection lance is supplied by its own separately controlled stream of finely divided solids depending from a distributor hopper so that, for example, in a 16 tuyere blast furnace provided with four distributor hoppers, four separate streams of solids are withdrawn from each distributor hopper to provide a separately controlled supply of powdered solids to the blast furnace inlets or tuyeres. The one or more withdrawal conduits depending from a distributor hopper, depending upon the length thereof, may require suitable vertically spaced aeration inlet means for gasiform material to maintain desired fluidity of the solids therein. It is preferred, however, in the method of this invention to employ relatively short withdrawal conduits of a length sufficient to include the necessary flow control means more fully discussed herein. Accordingly, the pressure of the vessel dilute phase above the bed of solids therein is preferably maintained above the pressure of the stream of solids below the valve or at the pickup point with the suspension forming gasiform material.

In the method and means of this invention, the finely divided solid carbonaceous material is introduced by a conduit or lance comprising, for example, a suitably sized carbon steel pipe inserted into the blast furnace through the tuyere or blowpipe. The lance may be surrounded by a high alloy shroud capable of withstanding elevated temperatures of about 1800° F. or higher. In this arrangement a small amount of a cooling medium, such as air, is introduced between the shroud and the lance to prevent the latter from overheating since when feeding a soft coal, overheating of the lance would tend to form coke inside the lance. This problem, however, is unlikely to occur when feeding powdered anthracite coal or powdered coke. However, to assure that coke formation within the lance may be corrected, provision may be made for passing an abrasive agent therethrough, such as sand, to scour the walls of the lance and remove any coke formed on the walls thereof. Furthermore, each lance may be provided with a removable elbow to permit replacement of the carbon steel lance when necessary and individual lances may be replaced at will without generally upsetting the normal operation of the blast furnace. It is to be understood that the lance is not necessarily a part of the blowpipe and may be inserted into the furnace separately but adjacent to the blowpipe or tuyere.

In the method and arrangement of steps of this invention, the total flow of carbonaceous solid material to be injected into the blast furance at the tuyere level is metered and set at a desired supply rate to the process by a weigh feeder located in an initial phase of the process. The drying, grinding and pressurizing steps of the process herein described may be located relatively remotely from the blast furnace because of limited space adjacent the blast furnace without upsetting the process and this is beneficial from a safety standpoint. Therefore, because of the solids hold-up in the overall process, there is inevitably a considerable lag between the time an adjustment is made to the weigh feeder supply setting and the time this adjustment becomes effective at the blast furnace tuyere. Accordingly, in order to provide substantially instantaneous supply and control of the carbonaceous material actually injected into the blast furnace, the distributor hoppers at the blast furnace are provided with level controllers which automatically withdraw powdered solid material from the pressurized surge vessel at such a rate as to maintain a desired solids inventory therein and available at the blast furnace irrespective of the actual demand rate of the solids injected.

As indicated hereinbefore, the powdered carbonaceous material introduced to, for example, a 16 tuyere blast furnace, is supplied by 16 separate streams of solids, either with or without suspension forming gasiform material with the overall pressure balance of the system arranged to provide sufficient pressure to inject the solids against the blast furnace back-pressure. Furthermore, the apparatus is designed and flow control means are provided which will accept pressure surges encountered therein from the blast furnace and respond thereto with an adequate margin of safety to maintain a desired flow of powdered solid material in the system. Accordingly, by proper positioning and correlation of pressure responsive means in the method and means of this invention, the desired flow of the powdered solids in the withdrawal conduits is maintained for discharge into the transfer conduits connected to the solids inlet lance at the blast furnace. It is contemplated injecting the solids into the blast furnace in a relatively dilute phase condition or a relatively dense phase condition. In the method of operation directed to dilute phase injection, the powdered carbonaceous material discharged into the transfer conduit is picked up in a suitable gasiform material to form a suspension and passed through the transfer conduit directly to the injection lance. In this arrangement the density of the suspension may be varied from about 1 to about 12 pounds per cubic foot by adjusting the volume of gasiform material and/or solids introduced to the transfer conduit, the only restriction being in maintaining a sufficient gasiform material-solids ratio and velocity conditions to pass the suspension through the transfer conduit. The dilute phase injection system, however, is readily adapted to dense phase injection of solids through the lance and this embodiment is accomplished in accordance with this invention by passing the dilute phase suspension into a small cyclone separator positioned above each lance and employing the cyclone dipleg for feeding carbonaceous solids downwardly in a dense phase condition directly to the lance.

In any of these arrangements, it is important to maintain a pressure balanced system which will respond to and feed the powdered solids at a desired rate through the individual injection lances irrespective of the pressure surges encountered in the blast furnace.

Accordingly, the solids in each withdrawal conduit, depending from a distributor hopper, as hereinbefore discussed, pass through suitable solids flow control valves, such as a slide valve, pinch valves or other suitable solids flow control valves positioned therein. The solids are discharged from the withdrawal conduit, combined with a suitable gasiform material to form a suspension which is thereafter passed through a transfer conduit to its respective solids injection lance. The gasiform material or compressible fluid employed to form the suspension with the finely divided carbonaceous material is supplied at a desired pressure and in an amount controlled by pressure responsive gas flow controllers which automatically compensate for changes in absolute pressure as measured at the distributor hopper, thus maintaining predetermined desired gas velocities in the range of from about 5 to about 90 feet per second, preferably from about 30 to about 40 feet per second in the transfer conduits despite pressure changes encountered therein and at the tuyere or injection lance of the furnace, which pressure may vary in the range of from about 5 to about 100 p.s.i.g. In the system and process herein described, a pressure drop across the solids flow control valve in each withdrawal conduit is held to a relatively low value within the range of from about 3 to about 6 p.s.i.g. to minimize erosion thereof and permit the valve to automatically compensate for relatively small pressure drop differences between the separate transfer conduits employed in the process. To maintain the pressure drop across the solids flow control valves within a predetermined desired range, a differential pressure controller provided in the system maintains a constant differential pressure between the bustle pipe at the blast furnace and the distributor hoppers, thus insuring that the pressure drop across each solids flow control valve remains in the desired range and erosion of the valve is held to a minimum.

The gasiform material employed to fluidize and convey the finely divided carbonaceous solids as a suspension through the transfer conduits is controlled and metered by suitable automatic flow control means to maintain a desired amount of gas at a substantially constant velocity in the transfer conduit and a velocity which is below undesired erosion velocities irrespective of the pressure encountered at the bustle pipe or tuyeres of the furnace. To accomplish this end, the gasiform fluidizing medium or compressible fluid is initially compressed to a pressure above the maximum pressure to be encountered in the process and thereafter metered to the process in accordance with the basic formula $$V = \frac{W}{D}$$

wherein "V" is the volume of the gasiform material, "W" is the weight rate of flow of gaseous material and "D" is the density of the gaseous material. The relationship of the basic formula is adapted, however, for use in applicants' process to provide that the weight rate flow "W" will vary according to the absolute pressure and in a direction consistent with changes in density due to changes in absolute pressure to maintain the ratio therebetween constant and the volume of gaseous material metered to the system therefore constant. Accordingly, a weight flow meter employed to automatically control the flow of gaseous material is pressure compensated to vary directly with the measured absolute pressure and proportionally the same as the density so that the ratio $W/D$ will remain constant and the volume of gas controlled constant. This control of the volume of gases necessarily controls the velocity of the gas in the transfer conduit, since the predetermined cross-sectional area thereof remains unchanged.

The gasiform material or compressible fluid employed in the process herein described may be air, which may or may not be preheated, or an inert gaseous material with respect to supporting combustion of the carbonaceous solids. It is also contemplated using gaseous combustion products or a gaseous material containing less than about 12 percent oxygen.

It is to be understood that the method and means of this invention are not necessarily limited to use with a blast furnace, but may be used with a cupola or any furnace operation involving feeding finely divided solid materials such as ore concentrate, sponge iron, flux, carbonaceous material or other finely divided solid material through a plurality of solids feed inlets.

Having thus provided a general description of the improved method and means of this invention, reference is now had to the drawings, by way of example, for a more complete understanding of specific embodiments of this invention. In general, the drawings represent diagrammatically systems and arrangements of process steps for grinding and drying raw coal to a fluidizable solid particle size, pressuring the fluidizable particles to a desired elevated pressure and maintaining a continuous supply of powdered coal particles for injection into a blast furnace at the tuyere level at a desired rate irrespective of the pressure conditions encountered in the process. For convenience in specifically describing the method and means of this invention, as well as to simplify the drawings, where there is a duplication of steps in the process these are outlined in suitably dotted line sections with only one being specifically shown and described.

Figure 1:
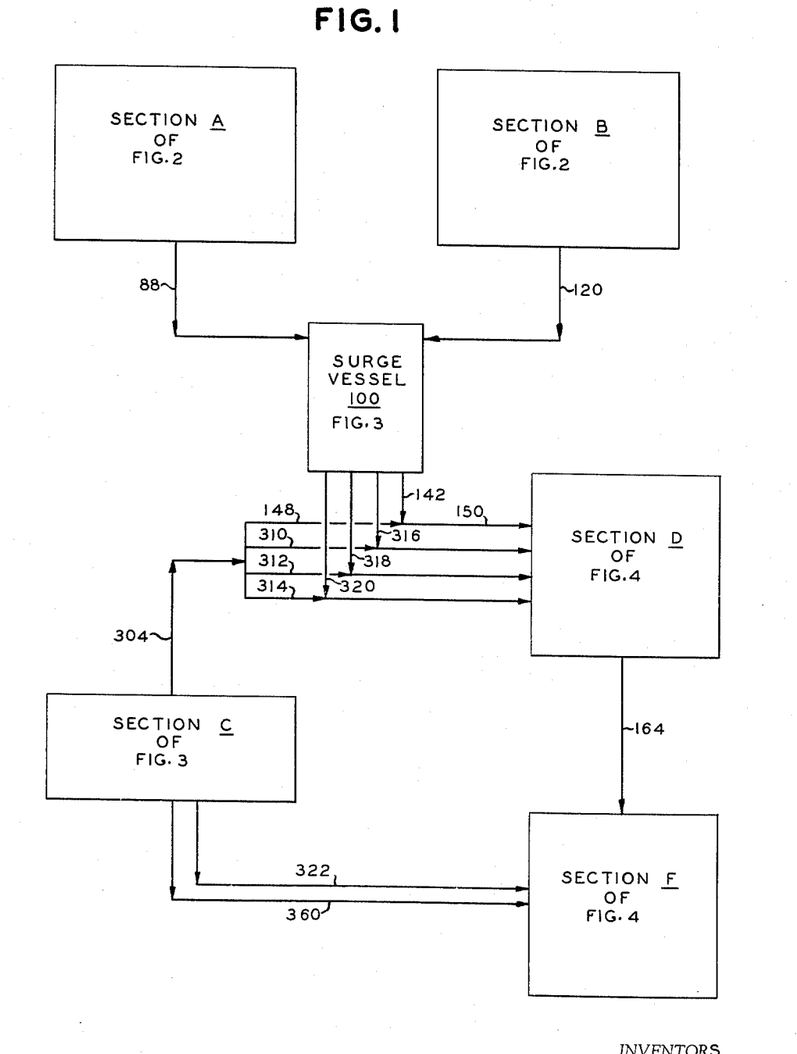
Figure 2:
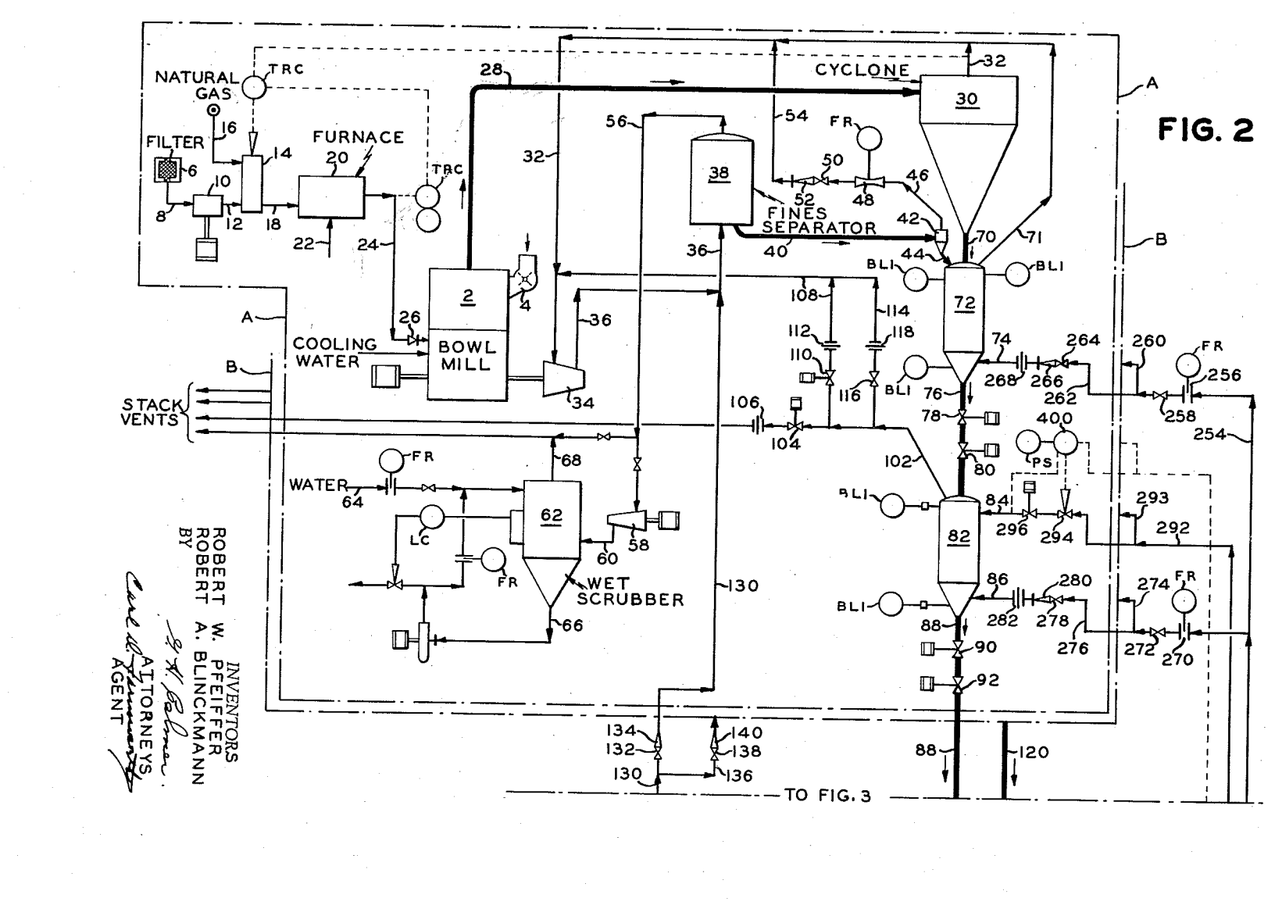
Figure 3:
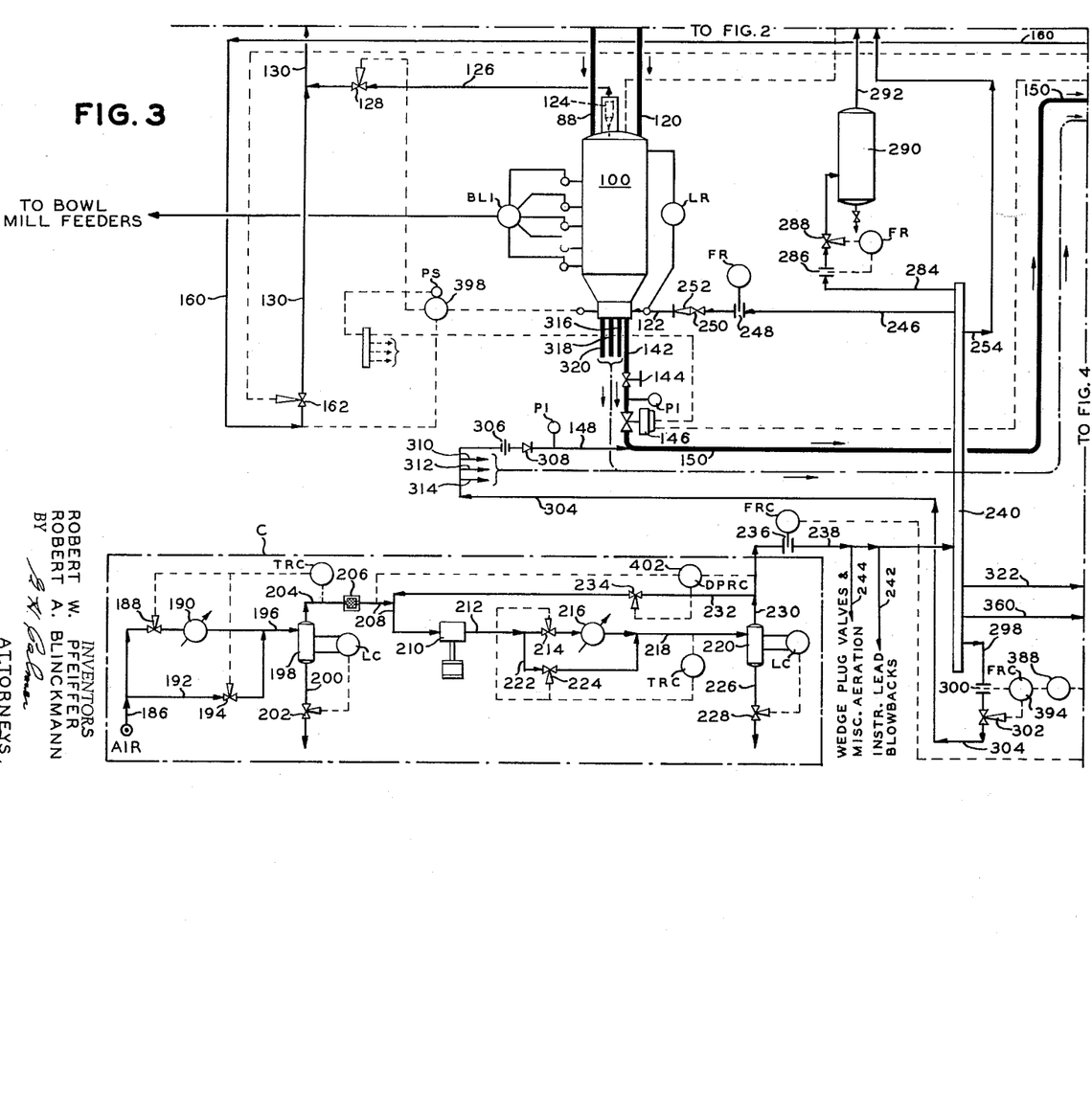
Figure 4:
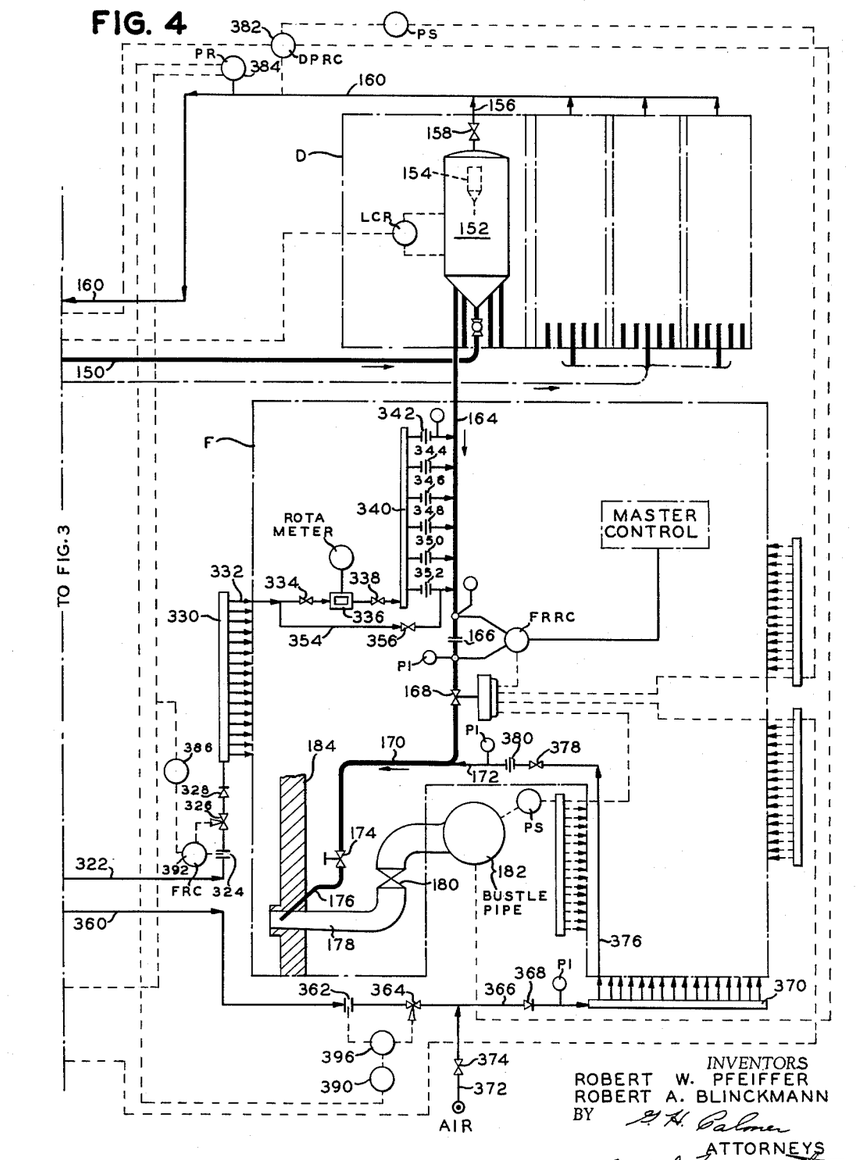

The blocked flow diagram, FIGURE 1, shows diagrammatically a general arrangement and combination of the process steps more specifically shown in FIGURES 2, 3 and 4. For example, the grinding, drying and pressuring steps prior to the pressurized surge vessel 100 are intended to be duplicated by one embodiment, as shown in FIGURE 1, and the process steps downstream of the pressurized surge vessel are duplicated to provide, in one embodiment, four distributor hoppers (Section D of FIGURE 4) having four standpipes 164 or withdrawal conduits, depending from each distributor hopper so that each standpipe individually feeds solids to a tuyere of a 16 tuyere blast furnace (Section E of FIGURE 4). Accordingly, four standpipes depending from the pressurized surge vessel 100 pass solids into transfer conduits similar to conduit 150 communicating with one of the four distributor hoppers in Section D of FIGURE 4. In the embodiment of this invention represented by FIGURE 5, the overall process is substantially the same, the primary difference being in the use of two lock hoppers in parallel flow arrangement and supplied by a single primary cyclone. The process steps of FIGURES 2 and 5 may be used singularly or in duplicate as desired.

Referring now to FIGURE 2, raw coal of a suitable size is fed to a grinding zone 2 known as a bowl mill by rotary air lock 4. The grinding and drying step hereinafter described are designed to produce 28,600 pounds per hour of dried coal of a particle size such that at least 72 percent of the coal is less than 200 mesh particle size and the largest coal particle size is less than 16 mesh. It is contemplated, however, using a larger particle size up to about 1/8 inch in the method of this invention, since they may be suitably handled in the process steps herein described. During grinding of the coal in zone 2, air at an elevated temperature of about 460° F. is introduced to dry the coal to a moisture content below 3 percent by weight and preferably to produce coal having a moisture content below about 1 percent, before separating the coal from the air in the primary cyclone described hereinafter. Primary combustion air is introduced to the process through a filter 6, passed by conduit 8 to a fan or compressor 10 and then by conduit 12 to a natural gas-air ratio controller zone 14. A combustible gas such as natural gas is introduced to the process by conduit 16 and passed to ratio controller zone 14. In zone 14 the ratio of combustible gas to air is maintained within a desired range for passage to combustion zone 20 by conduit 18, wherein the natural gas is burned with air to produce a hot gaseous combustion product at an elevated temperature, which is then combined with a secondary air stream introduced thereto by conduit 22 for the purpose of cooling or quenching the combustion products to a lower temperature. The temperature of the air heated by the hot combustion gases and thereafter fed into the bowl mill for the purpose of drying the ground coal is carefully controlled depending upon the type of carbonaceous material used in the process, since a bituminous coal must be treated under lower temperature conditions than an anthracite coal or coke and the temperature of the drying air, upon separation from the carbonaceous material, must be below temperatures supporting combustion. In the specific embodiment of this invention a bituminous coal is being employed and the combustion gases are cooled by the air combined therewith to provide an air stream at a temperature below about 500° F. and preferably about 460° F. The thus produced hot air stream is then passed by conduit 24 containing check valve 26 to grinding zone 2 to initiate drying of the ground coal. The preheated air stream employed to dry the ground coal forms a suspension therewith which is thereafter passed by conduit 28 to a relatively large primary cyclone separator 30. The fan 10 provided in air inlet conduit 8 is of a size sufficient to cause the atmospheric air stream and natural gas combined therewith to flow from controller 14 through conduit 18 to the combustion zone and then into the bowl mill maintained at a negative pressure. This negative pressure or pressure less than atmospheric pressure maintained in the drying and grinding circuit is to assure air leakage into, rather than out of the circuit. In cyclone separator 30 maintained at a negative or minus pressure of about −17 inches water gauge, the powdered coal is separated from the suspending air in a highly efficient manner to recover about 95 percent of the coal from the air. Thereafter the separated coal is withdrawn from the cyclone separator for passage to a storage hopper described hereinafter. The suspending air stream separated in cyclone 30 and containing a relatively small amount of entrained coal fines is removed from the cyclone by conduit 32 and passed under negative pressure conditions to the inlet or suction side of fan 34. Fan 34 is of a size sufficient to maintain a desired negative pressure on the system as herein described and will maintain about minus 19 inches of water at the inlet or suction side of fan 34. Fan 34 maintains the necessary negative pressure on the system herein described to exclude leakage of air and coal fines from the system, thereby improving the safety measures necessary in handling a mixture of powdered coal and air. The air stream containing entrained coal fines introduced to fan 34 is discharged at a slightly positive pressure of about 6 inches of water and passed by conduit 36 to a coal fines removal zone 38. The fines removal zone 38 is maintained under a slightly positive pressure wherein a plurality of small cyclones separates the bulk of the coal fines from the air stream passed thereto. Sufficient air introduced to separator 38 is withdrawn from the separated fines to form a suspension thereof which is then passed by conduit 40 to a small cyclone separator 42. In separator 42 coal fines are separated from the suspending gas and withdrawn from the bottom thereof by conduit 44 for passage to surge hopper 72 as described hereinafter. The suspending gas separated from the fines in cyclone 42 is withdrawn by conduit 46, passed through a venturi flow recorder 48, valve 50, check valve 52 and conduit 54 connected to negative pressure conduit 32 for recycle to fan 34.

The air stream separated and recovered from the coal fines in zone 38 still contains a small amount of coal dust therein, which is withdrawn by conduit 56, passed through a booster fan 58 and conduit 60 into a water scrubber 62. The booster fan 58 is provided to overcome the pressure drop of the water scrubber. Water is introduced to the upper portion of scrubber 62 by conduit 64 to remove coal dust from the air introduced thereto, thereby forming a slurry which is removed from the bottom of scrubber 62 by conduit 66. The thus formed slurry is thickened by means not shown and thereafter used as desired. The air separated from coal dust in scrubber 62 is then passed to a suitable vent stack, not shown, by conduit 68.

The finely divided powdered coal collected in cyclone 30 is passed by gravity through conduit 70 to a surge hopper 72 maintained at atmospheric or slightly below atmospheric pressure conditions. The powdered coal fines collected in cyclone 42 are also passed by gravity through a conduit 44 into hopper 72 as hereinbefore mentioned. Accordingly, surge hopper 72 collects substantially all of the ground powdered coal prepared and recovered in the system hereinbefore described, except that recovered from the wet scrubber 62. Atmospheric surge hopper 72 is provided with a plurality of vertically spaced temperature recorders, not shown, as well as upper, middle and lower solids level indicators, as shown, for the powdered coal introduced thereto. The coal in hopper 72 is continuously aerated with a gasiform material, such as air, introduced to the lower portion of the conical bottom of the hopper by conduit 74 to maintain the bed of coal therein in a flowable condition with the aeration gas being removed from the upper portion of the hopper by conduit 71 and combined with the effluent gas stream from cyclone 30 at a negative pressure in conduit 32. The coal in surge hopper 72 is passed by gravity from the conical bottom thereof through a conduit 76 provided with valves 78 and 80 to a lock hopper 82. In the system herein described, the lock hopper is provided to raise the pressure of the powdered coal from substantially atmospheric pressure conditions to an elevated pressure condition.

Figure 5:
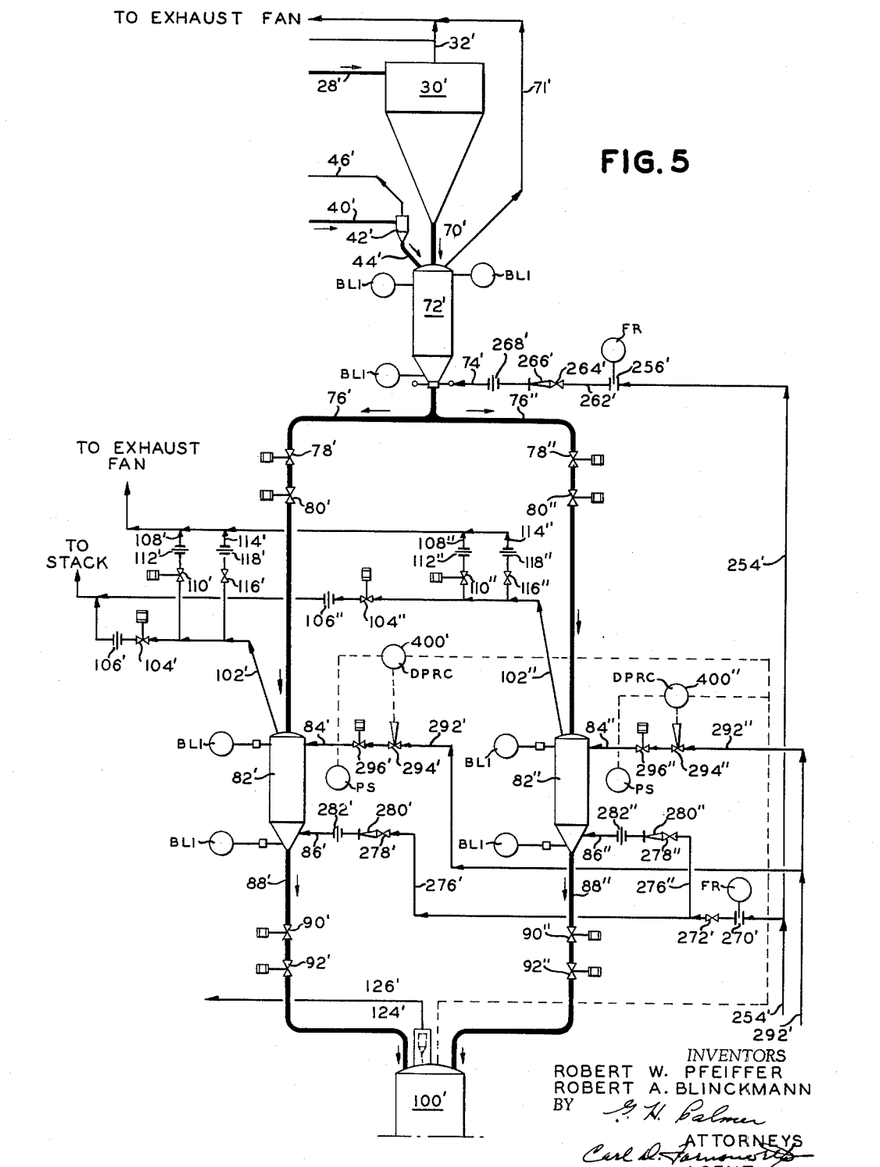

Accordingly, the lock hopper goes through a sequence of steps involving filling, pressuring, discharging and depressuring. During the filling step and when the coal in the lock hopper 82 reaches a desired level as indicated by a bin level control indicator (BLI) in the upper portion of the hopper, the indicator automatically closes valve 78 in conduit 76 to stop the flow of coal solids thereto and then valve 80 is thereafter closed to provide a gas tight shut off between the atmospheric surge hopper and the lock hopper. During filling of the lock hopper, the valves downstream thereof, of course, are closed. After filling of the lock hopper, and closing of valves 78 and 80, the pressure of the lock hopper is raised to a level slightly above that maintained in a pressurized surge vessel downstream thereof by the introduction of pressurized air through conduit 84. During the filling, pressuring and emptying steps, the coal in lock hopper 82 is aerated to maintain it in a flowable condition by the introduction of air by conduit 86 to the lower portion of the conical bottom of hopper 82. The pressuring and aerating air employed in the lock hopper is discharged from the upper portion thereof for discharge to the fines recovery steps described above or vented from the process, as more fully discussed hereinafter. After the lock hopper 82 is raised to a desired elevated pressure, sufficient to pass the coal therefrom to a pressurized surge vessel downstream thereof, valves 90 and 92 are opened automatically and the coal is passed from the conical bottom by conduit 88 to a pressurized surge vessel 100 shown in FIGURE 3. Valve 90 is an on-off solids control valve and valve 92 maintains a gas tight shut off between the lock hopper and the pressurized surge vessel 100. Valves 90 and 92 are automatically controlled for the proper opening and closing sequence when passing the coal from the pressurized lock hopper to the pressurized surge hopper or when closing these valves after the lock hopper has been emptied of coal. When a bin level indicator located in the conical bottom of the lock hopper, as shown, acknowledges that all of the coal has been discharged therefrom, a signal from the level indicator automatically closes valve 90 and 92 in the proper sequence, thereby separating the lock hopper from the pressurized surge vessel 100. The lock hopper 82 under an elevated pressure and after closing of the valves 90 and 92 is then depressured to a lower pressure in the range of from about 1 p.s.i.g. to about 5 p.s.i.g. by venting the gas or air therein through conduit 102 containing valve 104 and restriction orifice 106 to the atmosphere through a suitable vent stack, not shown. Upon reaching a predetermined low pressure, a pressure actuated switch then closes valve 104 and opens valve 110 in conduit 108 containing a restriction orifice 112. Conduit 108 is in open communication with conduit 32 maintained at a negative pressure, as hereinbefore described. In addition, a by-pass conduit 114 is provided and contains a shut off valve 116 and a restriction orifice 118 which is connected between conduit 102 and conduit 108. Valve 116 is normally in the open position so that a restricted flow of gas may be continuously removed from the lock hopper during filling of the lock hopper with coal, pressuring, emptying and depressuring. The main function of this conduit is to remove the aeration gas introduced to the bottom of the hopper. Conduit 108, containing valve 110 and restriction orifice 112 is open to gas flow after the lock hopper pressure has been substantially reduced during the depressuring step. In this specific embodiment, the lock hopper pressure is reduced during the depressuring step by venting the gas through conduit 102 containing valve 104 to suitable vent stacks, not shown, until the pressure of the lock hopper is reduced to a pressure of about 1 p.s.i.g. in a specific embodiment and thereafter valve 110 is automatically opened and valve 104 is closed so that the remaining gas in the lock hopper is passed by conduit 108 to conduit 32 maintained under a negative pressure. With the closing of valve 104 and opening of valve 110 the pressure of the lock hopper is reduced to at least atmospheric pressure and preferably to a negative pressure to facilitate refilling of the hopper with coal from surge hopper 72 and the cycle of operation described above is then repeated. In this specific embodiment the total cycle time for filling, pressuring, discharging and depressuring the lock hopper and all necessary valve movements to accomplish the above is generally of the order of about 7 minutes. However, this time cycle may be varied considerably, depending upon the size and number of lock hoppers employed. As shown in the embodiment of FIGURE 5, there may be two lock hoppers in parallel flow arrangement which are alternately used as described more fully hereinafter. It is contemplated in a specific embodiment, employing the above described steps beginning with the bowl mill grinding step up to the pressurized surge vessel 100 as a duplicate operation which feeds the powdered coal or carbonaceous material into a common pressurized surge vessel 100.

Referring now to FIGURE 3 and particularly to the pressurized surge hopper 100, the level of powdered coal maintained therein is measured by a plurality of level indicators shown, and coal is supplied thereto by conduits 88 and 120. That is, in a specific embodiment, the process steps described above which are upstream or prior to hopper 100 may be duplicated as shown in FIGURE 1 to provide a parallel arrangement of the above combination of steps for grinding, drying and pressuring the powdered coal sufficiently for introduction into hopper 100 by conduits 120 and 88. Vessel 100 is maintained at an elevated pressure in the range of from about 20 to about 100 p.s.i.g. by aeration air introduced by conduit 122 which is then removed from the top of hopper 100 by conduit 126 provided with control valve 128. The pressurized air in conduit 126 is reduced upon passing through valve 128 to a suitable lower pressure and thereafter passed by conduit 130 to valve 132 and check valve 134 to conduit 36 as shown in FIGURE 2. Branch conduit 136, FIGURE 2, containing valve 138 and check valve 140 is provided for passing a portion of the air stream in conduit 130 to the parallel process steps similar to that specifically shown and described above.

The powdered coal at an elevated pressure in hopper 100 is withdrawn from the lower portion thereof through a plurality of separate withdrawal conduits or standpipes similar to standpipe 142 as shown in the specific embodiment of FIGURE 3.

Standpipe 142 is provided in the lower portion thereof with valves 144 and 146 for controlling the flow of powdered coal solids downwardly through the standpipe. The powdered coal is discharged from the bottom of the standpipe at an elevated pressure into a transfer conduit 150 to which air is introduced by conduit 148 to form a suspension of coal in air which passes through transfer conduit 150 to a separator-distributor hopper 152, FIGURE 4, maintained at a lower pressure. The coal-air suspension enters the bottom of hopper 152 and passes upwardly therethrough under reduced velocity conditions sufficient to effect separation of the suspended coal from the air and form an aerated bed of powdered coal therein. The air may be passed through one or more cyclone separators 154 positioned in the upper portion of hopper 152 wherein entrained powdered coal is separated from the air and returned to the bed of coal therein by a suitable dipleg. The air stream is removed from the upper portion of hopper 152 by conduit 156 provided with valve 158, combined with similarly recovered air from the plurality of distributor hoppers and passed by conduit 160 to control valve 162, FIGURE 3, and into conduit 130 for recovery of coal fines therefrom in separator 38.

The powdered coal, separated and recovered in distributor hopper 152, is withdrawn therefrom through a plurality of withdrawal conduits or standpipes comprising in a specific embodiment, four withdrawal conduits 164 shown and described hereinafter.

The powdered coal is withdrawn from hopper 152 by conduit 164 provided with a venturi-flow nozzle 166 and control valve 168 in the lower portion thereof. The powdered coal in standpipe 164 is aerated in one embodiment by a plurality of air inlet points throughout the vertical height thereof to maintain the density of the carbonaceous material therein below about 45 pounds per cubic foot and preferably below about 23 pounds per cubic foot, for 70 percent −200 mesh coal. The powdered coal is discharged from the bottom of conduit 164 into a transfer conduit 170 to which air is introduced by conduit 172 to form a coal-air suspension of a concentration less than about 3 pounds of coal per cubic foot of air in transfer conduit 170. The thus formed suspension is passed at a relatively low velocity of about 32 feet per second through conduit 170 to shut off valve 174 which is normally open and thence to lance 176 which discharges into tuyere 178 adjacent the discharge end thereof. Tuyere 178, shown diagrammatically extending through wall 184 of the blast furnace through which the blast furnace air is passed, is provided with valve 180 and supplied with air by bustle pipe 182.

A portion of the air, particularly the pressurized air, employed in the process of this invention is taken from the blast furnace air compressors not shown and introduced to the above described process by conduit 186, FIGURE 3, passed through valve 188 to cooler 190 wherein the compressed air is cooled to a temperature of about 100° F. In order to provide a constant suction temperature to the booster compressor, bypass conduit 192 containing valve 194 is provided so that the air may partially or completely bypass cooler 190. The compressed air at a desired temperature passes by conduit 196 to a water knock-out drum 198. Water is removed from the bottom of drum 198 by conduit 200, provided with valve 202. The air is removed from drum 198 by conduit 204, passed through filter 206 and conduit 208 to a booster air compressor 210. The air stream is further compressed to a desired elevated pressure of about 70 to 100 p.s.i.g. in compressor 210 and then passed by conduit 212 containing valve 214, to cooler 216 wherein the compressed air is cooled to a temperature of about 100° F. The cooled air is then passed by conduit 218 to water knock-out drum 220. A bypass conduit 222 containing valve 224 is provided around cooler 216 so that the air stream may partially or completely bypass cooler 216. In drum 220 any water separated from the compressed air is removed from the bottom of the drum by conduit 226 containing valve 228. The dry compressed air is then removed from the top of drum 220 by conduit 230 for use as hereinafter described. A recycle conduit 232 containing valve 234 is provided to recycle the compressed air when desired to conduit 208 communicating with the inlet side of compressor 210 for the reasons more fully described hereinafter. The air in conduit 230 compressed to a desired elevated pressure which may be as high as about 100 p.s.i.g. is then passed through a flow recorder 236 and conduit 238 to an air distributor manifold 240 for distribution and use as hereinafter described. A portion of the air in conduit 238 is withdrawn by conduit 242 for use as instrument blowback air. Air is also withdrawn from conduit 238 by conduit 244 to blowback certain valves in the process and provide miscellaneous aeration air required in the process not specifically described. A portion of the compressed air in distributor manifold 240 is passed by conduit 246 through flow recorder 248, valve 250 and check valve 252 to conduit 122 communicating with the lower portion of the pressurized surge hopper 100 for use as hereinbefore described. Another portion of the air in conduit 240 is passed by conduit 254 through flow recorder 256, FIGURE 2, and valve 258, then through conduit 262, valve 264, check valve 266 and restriction orifice 268 to conduit 74 communicating with hopper 74 for use as described above with respect to FIGURE 2. A portion of the air in conduit 262 may be withdrawn by conduit 260 for similar use in a parallel system not shown. A portion of the air in conduit 254 also passes through flow recorder 270, valve 272 to conduit 276 and thence through valve 278, check valve 280, restriction orifice 282 to conduit 86 for use as described above. A portion of the air in conduit 276, FIGURE 2, may be withdrawn by conduit 274 for similar use in the parallel system, not shown. Another portion of the air in conduit 240, FIGURE 3, is passed by conduit 284 through a flow recorder controller 286 and valve 288 to an air surge drum 290. From air surge drum 290 the compressed air passes by conduit 292 through valve 294 FIGURE 2, and valve 296 to conduit 84 communicating with hopper 82 for use as described above. Air may also be passed from conduit 292 by conduit 293 to a parallel system, not shown, for similar use therein. Air is also withdrawn from manifold 240, FIGURE 3, by conduit 298 and passed through flow recorder controller 300 and valve 302 to conduit 304. The air in conduit 304 is passed through a restriction orifice 306 and check valve 308 prior to entering conduit 148 for use as described above. Branched conduits 310, 312 and 314 communicating with conduit 304 are also provided with a suitable restriction orifice and check valve (not shown) similar to 306 and 308 above for passing air to the base or discharge of one of the standpipes 316, 318 and 320 depending from vessel 100 to transfer powdered coal to one of the plurality of distributor hoppers, similarly to that specifically discussed above with respect to transfer conduit 150 and hopper 152.

Still another portion of the compressed air in manifold 240 is withdrawn by conduit 322 and passed through flow recorder controller 324, valve 326 and check valve 328, as shown in FIGURE 4 to an air distributor manifold 330 provided with 16 unnumbered, but shown, branched conduits similar to conduit 332 for passing aeration air to one of a plurality of standpipes, for example, 16 standpipes in the manner similar to that hereinafter specifically described with respect to standpipe 164. That is, as shown in FIGURE 4, air in manifold 330 is passed by one of the branched conduits leading therefrom and identified as branched conduit 332 through valve 334, air flow meter 336 and valve 338 to an air distributor manifold 340 provided with a plurality of branched conduits communicating with standpipe 164 for introducing instrument tap and valve blowback air (not shown) and/or aeration air. The branched conduits communicating between manifold 340 and standpipe 164 are provided with restriction orifices such as 342, 344, 346, 348, 350 and 352, which serve to split the flow as desired. A bypass conduit 354 containing valve 356 is provided for passing air from conduit 332 directly to the lower portion of standpipe 164.

Air is also withdrawn from manifold 240, FIGURE 3, by conduit 360, and passed through flow controller 362 and valve 364 to conduit 366, thence through check valve 368 to air distributor manifold 370. Conduit 372 containing valve 374 communicating with conduit 366 is provided for introducing emergency air to the process. Air distributor manifold 370 is provided with 16 branched conduits leading therefrom similar to conduit 376 containing valve 378 and restriction orifice 380 through which air is passed to conduit 172 for use as described above.

One of the important aspects of the process of this invention relates to the control system provided to assure flow of the powdered coal through the process to the tuyeres irrespective of the pressure encountered at the tuyere over a relatively wide range of pressure conditions in the range of from about 5 to about 100 p.s.i.g. To accomplish this end, a differential pressure controller 382, FIGURE 4, maintains a constant differential pressure between the blast furnace bustle pipe 182 and each of the distributor hoppers 152 through the air manifold connected thereto, thus insuring that the pressure drop across the slide valve in each standpipe remains in the range of from about 3 to about 6 p.s.i. irrespective of changes in the tuyere zone air pressure indicated above. The differential pressure controller 382 maintains the desired pressure drop by controlling the backpressure on valve 162, FIGURE 3, in conduit 160 through which air is passed from the pressurized distributor hoppers 152 to fines recovery separator 38, thereby maintaining the hoppers 152 at the desired elevated pressure. The air stream in conduit 340 employed to aerate the standpipes, the air in conduit 172 employed to transport the coal in dilute phase from the base of standpipe 164 through conduit 170 to injection lance 176, and the air employed to transport the coal through transfer conduit 150 are controlled by pressure compensated flow controllers which automatically compensate for changes in absolute pressure measured at the distributor hoppers as hereinbefore discussed, thereby maintaining essentially constant gas velocities despite system pressure changes. That is, the pressure maintained in conduit 160 by differential pressure control 382 is measured by absolute pressure recorder 384, FIGURE 4, and sends an appropriate signal to ratio meters 386, 388 (FIGURE 3) and 390 (FIGURE 4). Ratio meter 386 actuates flow recorder controller 392, controlling valve 326 to maintain a desired flow of aeration air to standpipe 164 irrespective of the pressure encountered in the blast furnace as described above. The ratio meters in conjunction with the flow controllers are in effect pressure compensated flow controllers which are set to maintain a desired air flow responsive to the absolute pressure maintained in the distributor hopper or in the air streams removed from the hoppers. Similarly, ratio meter 388, FIGURE 3, actuates flow recorder controller 394 controlling valve 302 to maintain a desired flow of air in conduit 304 communicating with conduit 148 employed to transport the coal discharged from standpipe 142 through conduit 150 to distributor hopper 152 irrespective of the pressure maintained therein as described above. Ratio meter 390, FIGURE 4, also receives an appropriate signal from pressure recorder 384, FIGURE 4, and actuates flow recorder controller 396 controlling valve 364 to maintain a desired flow of air to conduit 172 irrespective of the pressure encountered at the base of standpipe 164.

Pressurized surge vessel 100, FIGURE 3, is also provided with suitable pressure control means to maintain the pressure thereof above the pressure maintained in distributor hopper 152 to assure flow of the coal from the surge vessel to the hopper irrespective of the pressure maintained in hopper 152. That is, a differential pressure controller 398, FIGURE 3, controlling valve 128 in conduit 126 maintains a desired predetermined pressure in vessel 100 which is controlled by maintaining a preselected differential pressure between the bottom of vessel 100 and the pressure maintained in conduit 160 as hereinbefore described. This also serves to maintain a relatively low pressure drop of about 3 p.s.i. across the slide valve 146 in standpipe 142. A differential pressure recorder controller 400, FIGURE 2, controlling valve 294 for introducing pressuring air to hopper 82 is actuated by the pressure maintained in vessel 100 to assure that the pressuring air stream in conduit 292, FIGURE 2, is sufficient to pressurize lock hopper 82 to a pressure equal to or above that existing in vessel 100.

The air supplied to the process by conduit 186, FIGURE 3, is taken from the discharge of the blast furnace air compressors, not shown, supplying air to bustle pipe 182, FIGURE 4, so that the pressure of the air stream in conduit 186 will vary directly and in accordance with the pressure in bustle pipe 182. However, since the air stream employed in the process described hereinbefore in manifold 240, FIGURE 3, is required at a higher pressure, of about 50 pounds above that required in the bustle pipe, booster compressor 210, FIGURE 3, is provided to maintain the incremental pressure, and differential pressure recorder controller 402 associated therewith actuating valve 234 in recycle conduit 232 maintains the desired incremental pressure on the air stream passed to distributor manifold 240 by conduits 230 and 238.

In addition to the pressure control system hereinbefore described, a solids level controller is provided with each hopper to control the flow of coal thereto similar to that specifically described with respect to hopper 152 as shown, which actuates valve 146 in standpipe 142 depending from vessel 100 to maintain, upon demand, a desired level of powdered coal in hopper 152. Vessel 100 is also provided with suitable powdered coal level indicators shown which will stop and start the bowl mill of the process as required to maintain a supply of powdered coal in vessel 100.

The process described above is also provided with a plurality of strategically located automatic temperature controllers for safety reasons since the temperature of the air employed in the process with the powdered coal must be carefully controlled. Accordingly, the temperature of the compressed air in conduit 230 is maintained at a temperature of about 100° F. by a temperature recorder controller shown which actuates valves 214 and 224. Furthermore, the temperature of the air supplied to the bowl mill by conduit 24, FIGURE 2, is automatically controlled by a temperature recorder controller shown which actuates flow ratio controller 14 to maintain an air temperature not substantially above 460° F. by controlling the amount of natural gas combined with air and passed to furnace 20. Furthermore, the temperature of the air stream containing powdered coal fines removed from the cyclone separator 30, FIGURE 2, by conduit 32 is also controlled to a temperature not substantially above about 170° F. by the automatic temperature controller discussed above controlling flow ratio controller 14.

As an added safety feature in the process described above, temperature recording points have been provided throughout the process where considered desirable to permit rapid detection of any uncontrolled and unwanted temperature rises in the process. These temperature recorders are tied to an alarm system to warn operators of the process of the unwanted temperature rise and its location. At the operator's discretion a carbon dioxide system provided permits injection of carbon dioxide into the section of the process where the temperature rise has been detected. All or only a portion of the process may be so blanketed with carbon dioxide.

Start up of the process described herein is relatively simple, since it is based primarily on first establishing design air flows and pressure levels throughout all sections of the unit. Thereafter the air heater or furnace 20, FIGURE 2, is started by flowing natural gas thereto, thereby heating the air passed to the bowl mill 2. The temperature of the process will not exceed permissible limits, even without any coal flowing in view of the automatic temperature controls provided to limit the temperatures. Thereafter, the coal feeders to the bowl mill are started and the rate increased to a desired quantity. The remainder of the process will, thereafter, automatically establish itself to bring the finely divided ground coal from the bowl mill through the pressuring steps to the distributor hoppers 152 and thence to the powdered coal injection lance as hereinbefore described.

Shutdown of the process, however, requires other consideration, since for safety and operational reasons it is important to remove all of the powdered coal from the system. To accomplish shutdown, the coal feeders to the bowl mill are stopped. The natural gas flow to the furnace supplying heat to the air passed to the bowl mill will be decreased automatically in view of the reduced amount of coal flowing from the bowl mill until all is removed. A turndown ratio on the furnace combustion controls permits operating at desired low temperatures without flow of coal. After the bottom bin level indicator in atmospheric surge hopper 72 shows that all of the powdered coal has been removed from the vessel, the natural gas flow to the furnace is stopped, but air flow to the furnace is continued. During normal operation, a signal from the upper bin level indicator shown with lock hopper 82 automatically closes the valves 78 and 80 in conduit 76 between hoppers 72 and 82. Closing of these valves automatically during shutdown is not always possible because of insufficient powdered coal remaining in the system and manually operated bypass holding relays are included to permit operation manually of the normal charging-pressuring-discharging-depressuring cycle of the lock hopper 82 without the automatic bin level indicator signals. By this manual operation all of the powdered coal is removed from hoppers 72 and 82. With all of the powdered coal removed from the above portion of the system, the differential pressure controllers across the standpipes 142 of the pressurized surge vessel 100, is reset manually to zero to permit removal of all of the powdered coal from vessel 100. Thereafter, all of the coal is removed from the distributor hoppers 152 and standpipes 164 depending therefrom. It is important that air flow through the system be maintained for a sufficient length of time to assure that all of the powdered coal has been removed from the system, and valve 174 prior to each tuyere injection lance must be closed before the air flow through the process is completely stopped.

FIGURE 5 shows diagrammatically an embodiment of FIGURE 2 wherein the lock hopper 82 is employed in parallel flow arrangement. That is, the sequence of steps for raising the pressure of the powdered coal from atmospheric pressure to an elevated pressure as described with respect to FIGURE 2 is similarly employed in the parallel arrangement of FIGURE 5 when employing either hopper 82' or 82". The arrangement of FIGURE 5 is such that these hoppers 82' and 82" may be alternately supplied with powdered coal from surge hopper 72' and alternately discharge the pressured coal to vessel 100' in a similar manner to that described with respect to FIGURE 2. Accordingly, in view of the similarity of the process steps of FIGURE 5 to that specifically described with respect to FIGURE 2, identical numbering is employed with the addition of single and double prime to the numbers where required. The discussion of the method of operation of FIGURE 2 is equally applicable to that shown in the embodiment of FIGURE 5 when employing either of the parallel arranged lock hoppers and a detailed discussion of FIGURE 5 is not required.

It is to be understood that the parallel system of FIGURE 5 may be substituted in the arrangement of process steps of FIGURE 2 without major modifications thereto and such a substituted arrangement may be used singularly or in parallel, as specifically discussed with respect to FIGURE 2.

Having thus described by way of example specific embodiments of the method and sequence of steps of this invention, it is to be understood that minor modifications may be made thereto without departing from the spirit thereof.

We claim:

1. A method of injecting fluidizable solid material into a reaction zone of fluctuating pressure which comprises: preparing solid material to a fluidizable particle size, passing thus-prepared solid material through a series of pressure developing zones of increasing pressure in the direction of flow to a distributor zone, maintaining in said distributor zone a fluidized bed of solid material, the pressure in said distributor zone being maintained at a pressure greater than the pressure at the point of introduction of such material into a reaction zone, flowing a stream of fluidized solid material from said distributor zone to an injection zone discharging into the reaction zone, and controlling the flow of fluidized solid material in said stream at a predetermined substantially constant rate irrespective of the pressure fluctuations of said reaction zone.

2. The method of claim 1 in which a stream of gaseous material is admixed with a stream of fluidized solid material passed to said injection zone to produce a relatively dilute phase stream of fluidized solid material, flowing said dilute phase stream through said injection zone and discharging such stream into said reaction zone.

3. The method of claim 2 in which said gaseous material comprises an oxygen-containing gas.

4. The method of claim 2 in which said relatively dilute phase streams flowed through said injection zone is reduced in velocity to separate gaseous material from solid material which is discharged into said reaction zone.

5. A method of injecting fluidizable solid material into a reaction zone of fluctuating pressure which comprises: preparing solid material to a fluidizable particle size, passing thus-prepared solid material through a series of pressure developing zones of increasing pressure in the direction of flow to a distributor zone, maintaining in said distributor zone a dilute phase of the solid material above a relatively dense fluidized bed of solid material, the pressure of said dilute phase being maintained at a pressure greater than the pressure at the point of introduction of such material into a reaction zone, flowing separate and independently controlled streams of the fluidized solid material from said distributor zone to separate injection zones discharging into said reaction zone, and maintaining the independently controlled flow of fluidizable solid material in said separate streams at a predetermined substantially constant rate irrespective of the pressure fluctuations in the reaction zone.

6. The method of claim 5 in which the solid material is selected from the group consisting of bituminous coal, anthracite coal, coke, limestone, ore concentrate and sponge iron.

7. The method of claim 5 in which said reaction zone supplies heat to an ore smelting furnace.

8. A method of injecting fluidizable solid material into a furnace combustion zone of fluctuating pressure which comprises: grinding coal to a fluidizable particle size, passing fluidizable coal particles with a gaseous material to a separation zone at an elevated level wherein the coal is separated and recovered from the gaseous material, passing the recovered fluidizable coal from the separation zone by gravity through a series of pressure developing zones of increasing pressure in the direction of flow to a coal storage zone maintained at an elevated pressure above the pressure in a coal distributor zone, passing coal of a fluidizable particle size from said storage zone to at least one coal distributor zone, maintaining in said distributor zone a dilute phase of said particles above a relatively dense bed of fluidized particles, the pressure of said dilute phase being maintained at a pressure greater than the pressure at the point of introduction of such material into said furnace combustion zone, passing separate streams of fluidized coal particles from said distributor zone to separate injection zones discharging into a furnace combustion zone, maintaining the flow of coal particles through the separate streams at a predetermined rate which is substantially constant irrespective of the pressure fluctuations of said furnace combustion zone.

9. The method of claim 8 in which the solid material passed to said injection zones is preheated to an elevated temperature in said storage zone.

10. A method of injecting solid material into a blast furnace which comprises: grinding coal to a fluidizable particle size under negative pressure conditions, combining preheated gaseous material with the coal particles during the grinding step thereby drying the coal, passing a mixture of coal particles and preheated gaseous material as a suspension to an enlarged separation zone maintained under a negative pressure wherein the particles are separated and recovered from the gaseous material, passing the recovered particles from the separation zone to a plurality of distributor zones, maintaining in said distributor zones a dilute phase of solid particles above a relatively dense fluidized bed of coal particles, the pressure of said dilute phase being maintained at a pressure greater than the pressure at the point of introduction to a blast furnace, passing separate streams of coal particles from said distributor zones to injection zones discharging into a blast furnace, maintaining the flow of coal particles through the separate streams at a predetermined rate which is substantially constant irrespective of the pressure fluctuations in the combustion zone.

11. A method of injecting fluidizable solid material into a reaction zone of fluctuating pressure which comprises: preparing solid material to a fluidizable particle size, passing said thus-prepared solid material to a distributor zone, maintaining in said distributor zone a dilute phase of the solid material above a relatively dense fluidized bed of solid material, the pressure of said dilute phase being maintained at a pressure greater than the pressure at the point of introduction of such material into said reaction zone, flowing a stream of fluidized solid material from said fluidized bed to an injection zone discharging into said reaction zone, controlling the flow of fluidized solid material in said fluidized stream at a predetermined rate, admixing gaseous material and the fluidized stream of solid material to produce a relatively dilute phase stream of fluidized solid material for passage through said injection zone, and maintaining a substantially constant volumetric flow rate of gaseous material in said injection zone irrespective of absolute pressure fluctuations in said reaction zone.

12. A method of injecting fluidizable solid material into a reaction zone of fluctuating pressure which comprises: preparing solid material to a fluidizable particle size, passing said thus-prepared solid material to a distributor zone, maintaining in said distributor zone a dilute phase of the solid material above a relatively dense fluidized bed of solid material, the pressure of said dilute phase being maintained at a pressure greater than the pressure at the point of introduction of such material into said reaction zone, flowing a stream of fluidized solid material from said distributor zone to an injection zone discharging into said reaction zone, controlling the flow of fluidized solid material in said stream at a predetermined rate, admixing gaseous material and said stream of solid material to produce a relatively dilute phase stream of fluidized solid material for passage through said injection zone, varying the weight rate of flow of gaseous material which is admixed with said stream of solid material in direct proportion to the absolute pressure of the reaction zone thereby maintaining a substantially constant volumetric flow rate of the gaseous material in said injection zone irrespective of absolute pressure fluctuations in said reaction zone.

13. A method of injecting fluidizable solid material into a reaction zone of fluctuating pressure which comprises: preparing solid material to a fluidizable particle size, passing thus-prepared solid material to a distributor zone, maintaining in said distributor zone a dilute phase of the solid material above a relatively dense bed of fluidized solid material, the pressure of said dilute phase being maintained at a pressure greater than the pressure at the point of introduction of such material into said reaction zone, flowing a plurality of streams of fluidized solid material from said distributor zone to a plurality of injection zones discharging into a reaction zone, separately controlling the flow of said fluidized solid material in said dense phase streams at predetermined rates, admixing separate streams of gaseous material and said streams of solid material to produce relatively dilute phase streams for passage through said injection zones, maintaining a substantially constant differential pressure between said distributor zone and said reaction zone, varying the weight rates of flow of gaseous material which is admixed with the said streams of solid material in direct proportion to the absolute pressure of said reaction zone thereby maintaining a substantially constant velocity in said injection zones irrespective of pressure fluctuations in said reaction zone.

14. A method for introducing powdered coal into a blast furnace at the tuyere level which comprises: preparing coal to obtain fluidizable coal particles having a moisture content below about 3 percent by weight, passing the coal sequentially through a plurality of zones of increasing pressure in the direction of flow to at least one distributor zone, maintaining in said distributor zone a dilute phase of the particles above a relatively dense bed of fluidized particles, the pressure of said dilute phase being maintained at a pressure greater than the pressure at the tuyere level of the blast furnace, passing coal as a plurality of separate confined streams from said distributor zone to separate coal injection zones discharging into the combustion zone of a blast furnace, maintaining a substantially constant differential pressure between distributor zone and the point of injection of coal particles into a combustion zone irrespective of the absolute pressure encountered therein, admixing an air stream with each of said coal streams to provide mixed streams which are thereafter injected into the blast furnace combustion zone, and varying the weight rates of flow of air streams admixed with said coal in direct proportion to the absolute pressure of the blast furnace which is measured at said distributor zone thereby maintaining substantially constant velocities of said mixed streams.

15. A method for introducing a finely divided solid particle material selected from the group consisting of carbonaceous material, limestone, ore concentrate and sponge iron, into an ore smelting furnace which comprises: preparing the solid particle material to obtain a fluidizable solid particle material having a moisture content below about 3 percent by weight, passing the solid particle material into at least one distributor zone maintained under a pressure elevated above the absolute pressure at the point where such material is introduced to the ore smelting furnace, maintaining a fluidized bed of such solid particle material in said distributor zone, passing solid material as a plurality of separate confined streams from said distributor zone to separate solid particle material injection zones discharging into the combustion zone of an ore smelting furnace, maintaining a substantially constant differential pressure between the distributor zone and the injection zones, admixing an air stream with each of said plurality of confined streams to provide a mixed stream which is thereafter injected into the combustion zone, and controlling the weight rate of flow of the air streams admixed with solid particles in direct proportion to the absolute pressure of the ore smelting furnace which is measured at said distributor zone thereby maintaining substantially constant velocities of said mixed streams.

16. A method for supplying and feeding finely divided solid material of a fluidizable particle size into a blast furnace having pressure fluctuations at the tuyere level which comprises: grinding solid material to a fluidizable particle size in the presence of a drying gasiform material, forming a suspension of ground solid material and gasiform material which is thereafter passed to a separation zone to recover dry solid material from the suspending gasiform material, passing the solid material of a fluidizable particle size to at least one distributor zone maintained under an elevated pressure greater than the absolute pressure existing at the tuyere level of a blast furnace, maintaining a fluidized bed of solid particles in said distributor zone, withdrawing separate streams of solid material from said zone of elevated pressure and admixing therewith separate streams of a gaseous suspending medium of density, $D$, at a weight rate of flow, $W$, for passage to separate solid material injection zones discharging into the blast furnace at the tuyere level, varying, $W$, in direct proportion to the absolute pressure of the furnace to maintain the ratio of $W/D$ substantially constant.

17. A method of controlling the flow of a compressible gaseous fluid of density, D, introduced to a stream of finely divided fluidizable solid material at a weight rate of flow, W, and employed to convey such solid material as a suspension through an elongated confined transfer zone to a zone of fluctuating pressure sensing the absolute pressure of the zone of fluctuation pressure, varying the weight rate of flow, W, of gaseous fluid introduced to said solid material in direct proportion to the absolute pressure of said zone of fluctuating pressure to maintain the ratio, $W/D$, substantially constant, thereby maintaining a substantially constant volumetric flow rate in said transfer zone.

18. A method for controlling the linear velocity of a compressible gaseous fluid of density, D, introduced to a stream of finely divided fluidizable solid material at a weight rate of flow, W, and employed to convey such solid material as a suspension through an elongated confined transfer zone of essentially constant cross-section communicating between a zone of elevated pressure and a zone of lower pressure which comprises: maintaining a substantially constant differential pressure between said zones, sensing the absolute pressure of said zone of elevated pressure, varying the weight rate of flow, W, of gaseous fluid introduced to said solid material in direct proportion to the absolute pressure of said zone of elevated pressure to maintain the ratio, $W/D$, substantially constant, thereby maintaining a substantially constant linear velocity in said transfer zone irrespective of the absolute pressure fluctuations in the zone of lower pressure.

19. In a method for feeding powdered carbonaceous material to a blast furnace at the tuyere level in which an air stream is admixed with a stream of carbonaceous material for passage through a transfer zone discharging into a blast furnace, the improvement which comprises: maintaining a substantially constant differential pressure between a zone of elevated pressure containing a fluidized bed of powdered carbonaceous material and the pressure at the tuyere level of a blast furnace irrespective of pressure fluctuations of the blast furnace, sensing the absolute pressure of the blast furnace at a suitable point in this system, and varying the weight rate of flow of air admixed with the stream of carbonaceous material in direct proportion to the absolute pressure to maintain the ratio of the weight rate of flow of air to its density substantially constant, thereby maintaining a substantially constant linear velocity in said transfer zone.

20. A method which comprises: grinding coal to a particle size suitable for suspension in a gaseous material under subatmospheric pressure conditions in the presence of a drying gaseous material heated to elevated temperatures, separating the coal particles from the gaseous material, passing dried coal particles through a plurality of pressure zones of increasing pressure in the direction of flow to obtain an aerated bed of coal particles in a distributor zone maintained at an elevated pressure with respect to the pressure of the hearth of a blast furnace, passing separate streams of powdered coal from said bed at elevated pressure through a solids flow control valve at a rate controlled by actuating the valve respective to the flow of coal particles through a solids measuring zone into a plurality of coal injection zones which discharge into the hearth of a blast furnace at a predetermined constant rate.

References Cited by the Examiner

UNITED STATES PATENTS

| | | | |
|---|---|---|---|
| 1,206,112 | 11/16 | Holbeck | 75—42 |
| 1,535,174 | 4/25 | McGregor | 266—28 |
| 2,511,017 | 6/50 | Sherban | 266—28 |
| 2,650,161 | 8/53 | Totzek | 75—42 |
| 3,150,962 | 9/64 | Pearson | 75—42 |

DAVID L. RECK, *Primary Examiner.*

WINSTON A. DOUGLAS, *Examiner.*